Patented Dec. 14, 1937

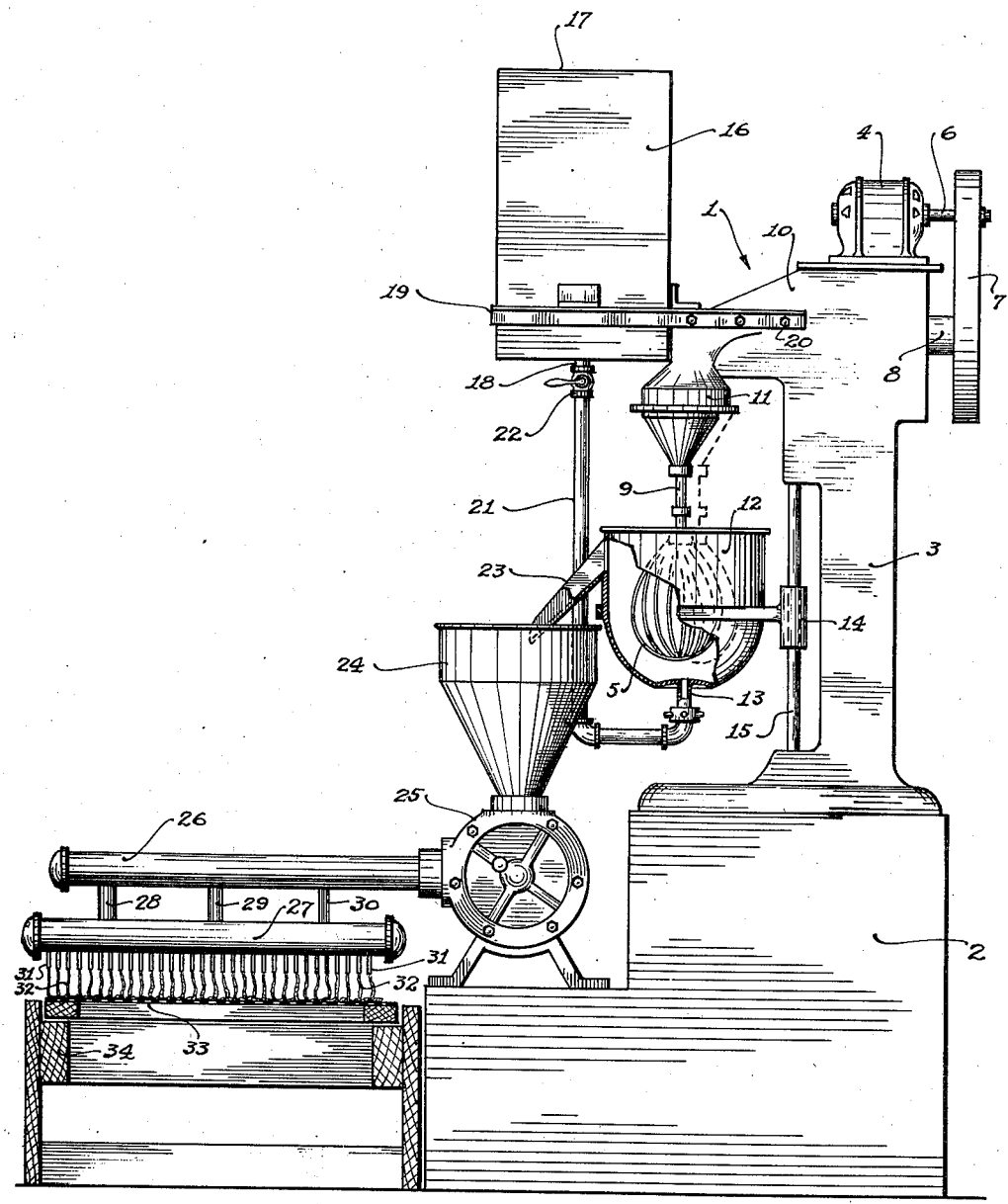

2,102,125

UNITED STATES PATENT OFFICE 2,102,125

WHIPPING APPARATUS

Leon D. Mink, Chicago, Ill., assignor to Industrial Patents Corporation, Chicago, Ill., a corporation of Delaware Application December 6, 1935, Serial No. 53,122

4 Claims. (Cl. 259—5)

This invention relates to an improved whipping device.

One of the objects of the invention is to provide means for the continuous whipping of liquid materials which form to a stiff consistency.

Another object of the invention is to provide means for whipping egg whites in which the unwhipped material may be fed in a continuous stream to the whipping apparatus.

Another object of the invention is to provide novel apparatus for whipping egg whites having means for feeding a supply of unwhipped egg material to a whipping chamber in an uninterrupted stream, means for whipping the egg material while passing through the chamber and means for conveying the resulting foam from the chamber in one continuous operation.

Other objects will be apparent from the description and claims which follow.

Egg whites are ordinarily dried by placing them in a pan and subjecting the contents of the pan to elevated temperatures in a drying tunnel until a dry flake is formed.

These desiccated egg whites are then scraped out of the pan and ground. This method of drying produces a small volume of the flaked product with a very tough texture and the product thus dried does not whip into a light batter when used for angel food cakes and similar products.

In China, it is customary to permit egg whites to ferment for a definite period before drying, the drying operation being then carried out after fermentation in a manner similar to that which has already been described. The fermentation produces a bad flavor which is decidedly objectionable in the dried egg white and is distinguishable in most finished bakery products.

Spray drying brings about quick desiccation but is not applicable in the egg drying industry because the operations are widely distributed and carried on in small units with insufficient volume to justify the expense of spray drying equipment. Furthermore, spray dried whites when reconstituted do not equal fresh or frozen whites.

In my co-pending application, Serial No. 37,375, filed August 22, 1935, entitled Treatment of egg whites, I have more particularly described and claimed a novel treatment of egg whites and a product of such treatment by which dried egg whites can be reconstituted to equal the original undried egg whites by the expedient of quick drying.

In my application, Serial No. 37,375, there is disclosed one form of apparatus which may be used in carrying out the method of that application.

The apparatus there disclosed, utilizes a batch whipper. Such whippers are effective but involve delay and labor in emptying and refilling the whipping chamber at the completion of each whipping operation. The present invention contemplates the employment of an improved apparatus for continuously whipping egg material.

The drawing is a side view of the improved egg whipper of this invention shown emptying into a foam receiving and extruding device. It will be understood that the inclusion of the receiving and extruding device in Figure 1 is merely illustrative and is not to be considered as limiting the present invention.

Machine 1 is mounted on platform 2 and comprises a main frame or standard 3 on which is mounted motor 4 driving whipper 5 through shaft 6, belt 7, shaft 8 and shaft 9, through appropriate gearing mechanism within the housing 10 of standard 3.

Whipper 5 through appropriate gearing mechanism within head 11 of housing 10 is rotated in a planetary movement. Whipping chamber or bowl 12 provided with inlet line 13 entering at the bottom thereof is held in fixed bracket 14 secured on stationary rod 15 of standard 3.

Supply vessel 16 having an open top 17 and outlet line 18 extending from the bottom thereof is held in a fixed position in bracket 19 secured to housing 10 by bolts 20. Line 21 extends from line 18 to line 13 and serves to carry unwhipped egg material from supply vessel 16 to whipping chamber 12. The supply of egg material entering whipping chamber 12 is controlled by cock 22 interposed in line 18.

Spout 23 extends from the side of whipping chamber 12 in horizontal alignment with whipper 5 and serves to pass the foamed egg whites from the whipping chamber to funnel 24 or other receiving receptacle.

In the receiving apparatus illustrated in the drawing, the foamed egg whites are drawn from funnel 24 by pump 25 and forced through line 26 communicating with discharging pipe 27 through lines 28, 29, and 30.

The egg foam forced into distributing pipe 27 in this manner passes out through a plurality of tubes 31 forming foam rods 32 on screen 33 which may be manually moved on rack 34 are carried under distributing pipe 27 by an endless conveyor.

The filled screens 33 are placed in a dryer and the foam rods dried in a manner more particularly described and claimed in my co-pending application Serial No. 57,974, filed January 7, 1936, entitled Drier.

In practice, a supply of unwhipped egg material is placed within vessel 16 through open top 17, whence it is fed by gravity through line 21 to enter the lower portion of whipping chamber 12 in the form of a thin uninterrupted stream.

A can of egg whites placed a few feet above the level of the whipper bowl will provide a sufficient head to cause the egg whites to flow at the rate of about one hundred pounds per hour, which is the capacity of the ordinary commercial whipper. If desired, a constant feed pressure may be maintained by a pump or other means.

The flow of egg material through line 21 is controlled by cock 22, to provide a stream commensurate with the whipping capacity of whipper 5. The supply of egg material entering chamber 12 rises in contact with rotary wire whipper 5 by which it is whipped into a fine fluffy foam. The resulting foam, which, of course, tends to float, remains above the surface of the fresh supply entering from line 21 and gradually rises to a level above spout 23. The whipped foam rising above the level of the spout 23 is of a rather stiff consistency and will not flow by the action of gravity alone. Due to the planetary movement of whipper 5, however the foamed egg whites above spout 23 are forcibly passed from whipping chamber 12 at each turn of whipper 5 passing spout 23. Spout 23 serves to carry the foam formed in whipping chamber 12 to funnel 24 or other receptacle which may be provided therefor.

The present invention has been described as applied to whipping egg whites by way of illustration. It will be understood that the invention is also applicable to mixing cake and candy batters and for whipping icings, emulsions and the like, which form into a substantially non-flowable state.

The term "stiff consistency" is used in the claims of this application to define the degree of firmness to which the fluid materials will be whipped, and shall be understood to mean a substantially non-flowable condition.

I claim:

1. A device for continuously whipping liquid materials which form to a stiff consistency, comprising a whipping bowl having an inlet at the base thereof and an outlet above the inlet, a rotary whipper having a planetary movement mounted to extend within the bowl in horizontal alignment with the outlet, and means for introducing the liquid material through the inlet in an uninterrupted stream to rise in contact with the whipper, the foam resulting from the whipping operation being raised relative to the outlet by the action of the incoming fluid and forcibly passed through said outlet by the planetary movement of the whipper.

2. A device for continuously whipping liquid egg whites comprising a whipping bowl having an inlet at the base thereof and an outlet above the inlet, a rotary whipper having a planetary movement mounted to extend within the bowl in horizontal alignment with the outlet, and means for passing the liquid egg whites in an uninterrupted stream through the inlet to rise in contact with the whipper, the foam resulting from the whipping operation being raised relative to the outlet by the action of the incoming fluid and forcibly passed through said outlet by the planetary movement of the whipper.

3. In a device for continuously whipping liquid materials which form to a stiff consistency, a whipping chamber having an outlet at the side thereof, a rotary whipper having a planetary movement mounted to extend within the chamber in horizontal alignment with the outlet, a material supply vessel and a line extending from the vessel to the whipping chamber for introducing the material in an uninterrupted stream into the chamber to rise in contact with the whipper, the foam resulting from the whipping operation being raised relative to the outlet by action of the incoming fluid and forcibly passed through the outlet by the planetary movement of the whipper.

4. In a device for continuously whipping a liquid material which forms to a stiff consistency, a whipping chamber having an outlet at the side thereof, a rotary whipper having a planetary movement mounted to extend within the chamber in horizontal alignment with the outlet, a material supply vessel, a line extending from the vessel to the chamber at a point below the whipper for introducing the material in an uninterrupted stream into the chamber to rise in contact with the whipper, and means for controlling the flow of the material through the line, the foam resulting from the whipping operation being raised relative to the outlet by action of the incoming fluid and forcibly passed through the outlet by the planetary movement of the whipper.

LEON D. MINK.